(12) United States Patent
Hwang

(10) Patent No.: US 9,477,401 B2
(45) Date of Patent: Oct. 25, 2016

(54) FUNCTION EXECUTING METHOD AND APPARATUS FOR MOBILE TERMINAL

(75) Inventor: Yoon Mi Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 661 days.

(21) Appl. No.: 12/882,294

(22) Filed: Sep. 15, 2010

(65) Prior Publication Data

US 2011/0066976 A1    Mar. 17, 2011

(30) Foreign Application Priority Data

Sep. 15, 2009 (KR) .................... 10-2009-0086891

(51) Int. Cl.
  *G06F 3/0488*  (2013.01)
  *G06F 3/0486*  (2013.01)
(52) U.S. Cl.
  CPC ......... *G06F 3/04883* (2013.01); *G06F 3/04886* (2013.01)
(58) Field of Classification Search
  CPC ............. G06F 3/0482; G06F 3/04842; G06F 3/04817
  USPC ........................ 715/810, 783, 764
  See application file for complete search history.

(56) References Cited

U.S. PATENT DOCUMENTS

| 6,026,410 | A | 2/2000 | Allen et al. |
| 7,607,102 | B2 * | 10/2009 | Ording et al. ............... 715/769 |
| 8,302,032 | B2 * | 10/2012 | Shin et al. .................. 715/862 |
| 8,543,379 | B1 * | 9/2013 | Michelsen ...................... 704/9 |

FOREIGN PATENT DOCUMENTS

| JP | 2001-512605 A | 8/2001 |
| KR | 2002-0082510 A | 10/2002 |
| KR | 10-2009-0035499 A | 4/2009 |

OTHER PUBLICATIONS

Korean Intellectual Property Office Notification of Preliminary Rejection dated Mar. 28, 2016.

* cited by examiner

*Primary Examiner* — Jeffrey A Gaffin
*Assistant Examiner* — Sabrina Greene
(74) *Attorney, Agent, or Firm* — Cha & Reiter, LLC

(57) ABSTRACT

A function executing method and apparatus for a mobile terminal is disclosed. The mobile terminal may execute a function. The function is associated with a target item according to information written in a selection item. The function executing method may include detecting an event related to a selection item and a target item among a plurality of menu items. The method then parses, upon detecting the event text information of the selection item. The method then executes a function associated with the target item according to the parsed text information.

28 Claims, 11 Drawing Sheets

FUNCTION EXECUTING METHOD AND APPARATUS FOR MOBILE TERMINAL

CLAIM OF PRIORITY

This application claims, pursuant to 35 U.S.C. §119(a), priority to, and the benefit of the earlier filing date of, that Korean patent application filed in the Korean Intellectual Property Office on Sep. 15, 2009 and assigned Serial No. 10-2009-0086891, the entire disclosure of which is hereby incorporated by reference.

BACKGROUND OF THE INVENTION

1. Field of the Invention

The present invention relates to an operation control method for a mobile terminal. More particularly, the present disclosure is directed to a method and apparatus for a mobile terminal that enables execution of a desired function of the mobile terminal in a convenient and rapid manner by combining different menu items.

2. Description of the Related Art

With rapid advances in communication technology, mobile terminals now provide diverse functions. Mobile terminals also are equipped with attractive user interfaces (UI). Mobile terminals provide menu items for executing various functions.

In most cases, one menu item is mapped to one function or application in a mobile terminal. For example, assume that nine menu items are provided on the screen of the mobile terminal. The nine menu items may be separately activated. Generally, the number of functions or applications directly executable through the menu items corresponds to the number of menu items and also is nine.

When the user desires to invoke a function not mapped to one of the nine menu items, the user may have to find and select the function through two or three menu levels. If the user is unfamiliar with the path leading to the function, it may take a long time for the user to find the function.

SUMMARY OF THE INVENTION

The present invention has been made in view of the above problems, and the present invention provides a method and apparatus that heighten user accessibility to functions of the mobile terminal.

The present invention also provides a user interface that enables the user to utilize functions of the mobile terminal in a convenient and intuitive manner.

The present invention further provides a method and apparatus that enable a specific function of the mobile terminal to be executed in a convenient and rapid way. The method and apparatus simplifies an input and selection process that is needed to execute the function through a combination of menu items.

The present invention further provides a method and apparatus. The method and apparatus provides that when a selection item and a target item are selected among multiple menu items then a specific function is mapped to the target item. The function then is executed in a convenient and rapid fashion according to information of the selection item.

The present invention further provides a method and apparatus that enable various functions to be executed in a convenient and rapid fashion. The method and apparatus makes a gesture of combining a memo item having pre-recorded task descriptions with a target item.

In accordance with an exemplary embodiment of the present invention, there is provided a method for a mobile terminal, comprising detecting an event, the event being related to a selection item and a target item, the selection item and the target item being provided from a plurality of menu items displayed on the mobile terminal and upon detecting the event parsing text information from the selection item and executing a function, the function being associated with the target item, the function being related to the parsed text information.

In accordance with another exemplary embodiment of the present invention, there is provided a method for a mobile terminal, comprising providing a selection item; and detecting a combination function event, the combination function event being related to the selection item and a second item; and analyzing a target item, the target item being combined with the selection item; and parsing text information from the selection item and providing the parsed text information to the target item; and executing a function associated with the target item, the function being executed relative to the parsed text information.

In accordance with another exemplary embodiment of the present invention, there is provided a mobile terminal comprising: a display unit comprising a selection item and a target item; and a control unit, the control unit controlling an operation upon detecting an event, the event combining the selection item with the target item, the operation executing a function, the function being associated with the target item, the function being related to text information of the selection item, wherein the text information matches a parameter of the target item to execute the function.

According to yet another embodiment there is provided an input device. The input device comprising a selection item and a target item and providing a first signal when selecting the selection item and providing a second signal when selecting the target item and providing a third signal when combining the selection item with the target item.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Figure 1:
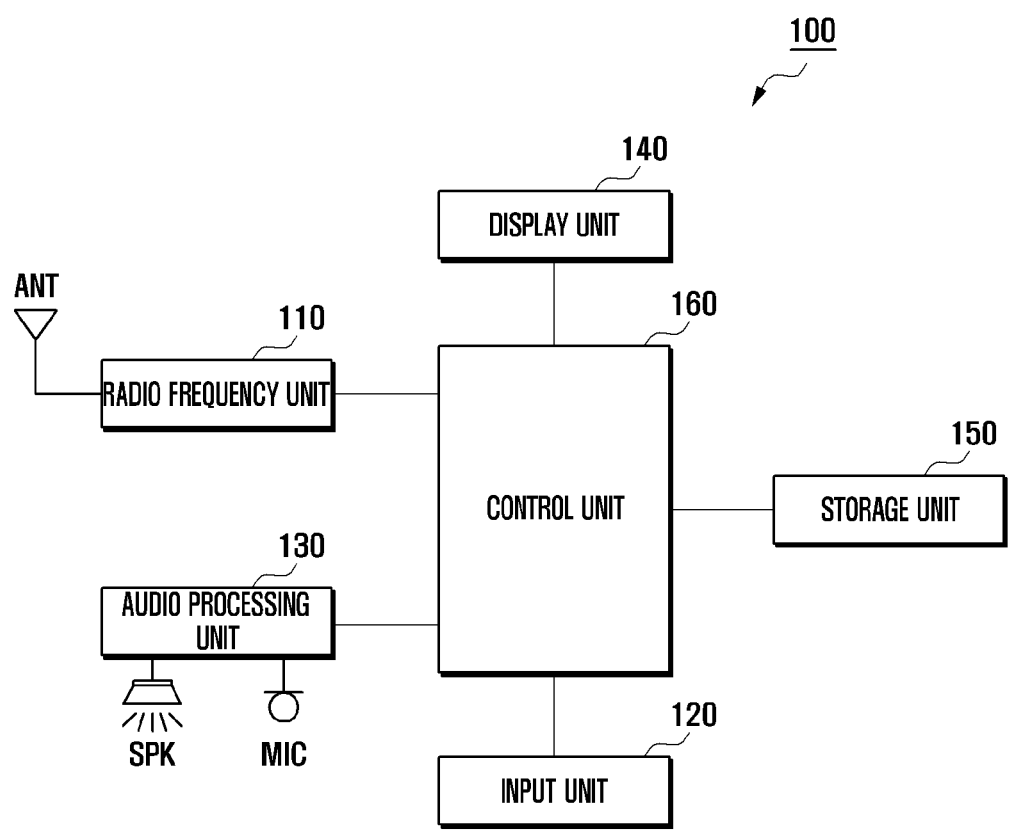
FIG. 1 is a block diagram of a mobile terminal according to an exemplary embodiment of the present invention.

Hereinafter, exemplary embodiments of the present invention are described in detail with reference to the accompanying drawings. The same reference symbols are used throughout the drawings to refer to the same or like parts. For the purses of clarity and simplicity, detailed descriptions of well-known functions and structures incorporated herein may be omitted to avoid obscuring the subject matter of the present invention.

The present invention relates to a function executing method and apparatus for a mobile terminal. The mobile terminal of the present invention enables rapid execution of a specific function. This can be performed in one embodiment by skipping repeated menu selection using the input device and by skipping information input actions. In the present invention according to one embodiment, a desired function may be executed in a convenient and rapid fashion by combining menu items.

That is, the user may execute a desired function by writing a description on a desired task in a selection item (one of the menu items). Thereafter, the user may make a gesture or input of moving the selection item having the task description to a target item (another one of the menu items). Here, the function associated with the target item is executed according to the input of the task description of the selection item.

In the present invention, a specific function associated with a menu item may be executed by a user gesture of combining menu items. The user gesture may correspond to a user action. The user action being taken to select and combine two or more menu items on the screen. In another embodiment, more than two menu items can be combined.

The user gesture may correspond to a drag-and-drop event using an input device. The drag and drop event may correspond to a menu item that is selected and moved to another menu item with which it is merged. The user gesture may correspond to a multi-touch event. The multi-touch event may correspond to where a first menu item is selected and then a second menu item is selected while the touch on the first menu item is sustained. This may be accomplished using a touch screen or the like. The user gesture may correspond to a single-touch event, by which a menu item is selected and then activated or where another second menu item is selected. The user gesture may correspond to a key action on the keypad or touch pad and for generating an event. The user gestures may correspond to input actions generating predefined events. The input user gestures may be grouped into selection gestures for selecting a menu item, and command gestures. The command gestures may be for executing a specific function by combining menu items.

As described above, user gestures may include any user actions that can select two or more menu items. In the following description, drag-and-drop events are mainly used to depict embodiments of the present invention; however the present invention is not limited to drag-and-drop input events and may encompass any input signals used to provide a signal to a processor.

In an embodiment, a menu item may refer to an object having a related menu or user function. For example, a menu item may be an object capable of executing or activating a mapped user function or capable of executing or activating a sub menu. The menu items may be various elements of a graphical user interface (GUI) including text, icons, widgets, and any combinations thereof.

The mobile terminal of the present invention may recognize a user gesture made on the touch screen. The mobile terminal may identify menu items to be combined according to a user gesture made on the touch screen. The mobile terminal may also identify a function executable through the identified menu items, and then directly execute the identified function to provide convenience to the user so the user does not have to open several different menus or submenus.

Next, a description is provided of the operation of a mobile terminal having a touch screen according to an embodiment of the present invention. However, the present invention is not limited by or to the following description, and various changes and modifications are possible.

FIG. 1 is a block diagram of a mobile terminal 100 according to an exemplary embodiment of the present invention.

Referring to FIG. 1, the mobile terminal 100 includes a radio frequency unit 110 with antenna ANT, an input unit 120, an audio processing unit 130, a display unit 140, a storage unit 150, and a control unit 160. Preferably, the radio frequency unit 110, the input unit 120, the audio processing unit 130, the display unit 140, the storage unit 150 are all connected to the control unit 160. The radio frequency unit 110 includes an antenna ANT, and the audio processing unit 130 includes a speaker SPK and a microphone MIC. Next, each element of the mobile terminal 100 will be described in detail.

The radio frequency unit 110 performs wireless communication for the mobile terminal 100. Under the control of the control unit 160, the radio frequency unit 110 establishes a communication channel to a network (or base station) according to a preset communication scheme. The radio frequency unit 110 then sends and receives radio signals for calls including a voice call and a video call. The radio frequency unit 110 then also provides data communication related to a short message service (SMS), multimedia messaging service (MMS), and Internet service. The radio frequency unit 110 converts voice/sound data and control data into a radio signal. The radio frequency unit 110 transmits the radio signal. The radio frequency unit 110 receives a radio signal and converts the radio signal into voice/sound data and control data for output. The radio frequency unit 110 may include a transceiver that up-converts the frequency of a signal to be transmitted. The transceiver then amplifies the signal, and low-noise amplifies a received signal and down-converts the frequency of the received signal. Although the radio frequency unit 110 is depicted as a single unit, it may be configured as multiple units for multi-mode mobile communication. Various radiofrequency 110 units or devices are possible and within the scope of the present disclosure.

The input unit 120 sends input signals for entering alphanumeric data. The data is used for setting and controlling various functions and the signals are provided to the control unit 160 as is known in the art. The input unit 120 may include a number of alphanumeric and function keys that generate input signals or the input unit 120 may comprise a touch screen having keys. The function keys may include directional keys, a side key or button, and a shortcut key or button. The function keys may be associated with corresponding functions of the device 100. The input unit 120 may include one or more of a touchpad, a touch screen, and a keypad (qwerty keypad, a key pad having a 3*4 format, or a key pad having a 4*3 format) according to the design. In particular, the input unit 120 may generate an input signal for executing a specific function by combining menu items.

The audio processing unit 130 includes a speaker SPK for outputting incoming and outgoing audio data during a call. The audio processing unit 130 includes a microphone MIC for collecting an audio signal such as a voice signal during a call. The audio processing unit 130 may be connected to the microphone MIC and speaker SPK. The audio processing unit 130 converts a voice signal from the microphone MIC into data. The audio processing unit 130 sends the data to the control unit 160, and converts a voice signal from the control unit 160 into an audible sound through the speaker SPK. The audio processing unit 130 may reproduce various audio components generated by the mobile terminal 100 (such as an audio signal generated during playback of an MP3 file or a similar audio file) according to a user selection to provide additional functionality.

In particular, the audio processing unit 130 may output an audio signal. The audio signal can be for a notification that menu items are combined or for a "notifying function execution" signal by combining menu items. That is, by combining a selection item with a target time, the audio processing unit 130 may then output an audio signal indicating the function execution. Output of an audio signal that indicates the function execution can be replaced with a vibration in a predetermined pattern according to the design or user settings.

The display unit 140 displays a screen according to operation of the mobile terminal 100. For example, the display unit 140 may display a boot screen, idle screen, menu screen, and call handling screen or any other screen known in the art. The display unit 140 may display various data related to the operation and state of the mobile terminal 100. The display unit 140 may be realized using liquid crystal display (LCD), organic light emitting diode (OLED), or active matrix OLED (AMOLED) technology or another display. The display unit 140 may have a touch screen capability. In this embodiment, the display unit 140 acts as an input device and output device. In particular, the display unit 140 may provide an output or screens having preset menu items. The menu items may include various GUI elements such as text, icons, and widgets. The display unit 140 may display an icon or image. The icon or image may indicate an activation of a function execution mode using a menu item combination.

The storage unit 150 may include a read only memory (ROM) and random access memory (RAM). The storage unit 150 stores various data created and used in the mobile terminal 100. Such data may include data necessary for executing a particular function. Data may include for example, information written in a memo item, data generated in the course of using the mobile terminal 100, and data received from external sources. For example, the external sources may be received from a base station, a counterpart mobile terminal, and personal computer. The data may also include menu items associated with specific functions or menu data provided by the mobile terminal 100. The storage unit 150 may store data necessary for communication through the radio frequency unit 110 and storage unit 150 may store various setting information for the mobile terminal 100.

In addition, the storage unit 150 may include one or more buffers to temporarily store data generated by a function execution of the mobile terminal 100. For example, the storage unit 150 may provide a buffer of a predetermined size. The buffer may then store data carried by signals transmitted and received through the radio frequency unit 110. The storage unit 150 may provide a buffer of a predetermined size to store data generated by menu item combination operations.

The storage unit 150 may include internal storage media and external storage media such as a smart card. The storage unit 150 may include a ROM, RAM, flash memory, and a combination thereof such as a multi-chip package. Various memory devices are possible and within the scope of the present disclosure.

The control unit 160 controls the overall operation of the mobile terminal 100. The control unit 160 controls signal exchange between the internal components thereof. The control unit 160 controls signal flow between the radio frequency unit 110, input unit 120, audio processing unit 130, display unit 140, and storage unit 150.

In particular, the control unit 160 controls a function execution triggered by combining a selection item with a target item. For example, the items may be inputs associated with a menu for example, a selection input associated with a first menu and a target selection input of a second menu. That is, the control unit 160 controls execution of a particular function. The function is mapped to the target item using information written in the selection item according to a user gesture or similar input. The function may be mapped via an executable code or the like. The control unit 160 parses the information written in the selection item according to the type of the target item. The control unit 160 controls execution of a function mapped to the target item using the parsed information. The control unit 160 controls the overall operation of the present invention described in connection with FIGS. 2 to 11.

FIG. 1 depicts a system diagram of the mobile terminal 100. However, the mobile terminal 100 is not limited to the configuration of FIG. 1.

The mobile terminal 100 may further include a baseband module for a mobile communication service. One or both of the control unit 160 and the radio frequency unit 110 may include a baseband module.

Although not shown in FIG. 1, according to the design, the mobile terminal 100 may further include other devices not shown. The mobile terminal 100 may include a camera module for capturing image data by taking a picture of a target object, a short range communication module for short range communication, an Internet communication module for connecting to an Internet network, a digital broadcast reception module for receiving and reproducing mobile broadcasts such as Digital Multimedia Broadcasting (DMB) or Digital Video Broadcasting (DVB), and the terminal 100 may also include a BLUETOOTH® module for BLUETOOTH® communication. Given the trend towards digital convergence, it should be apparent to those skilled in the art that the mobile terminal 100 may further include additional units known in the art or known in the future, and one unit may be removed or replaced by another unit.

Figure 2:
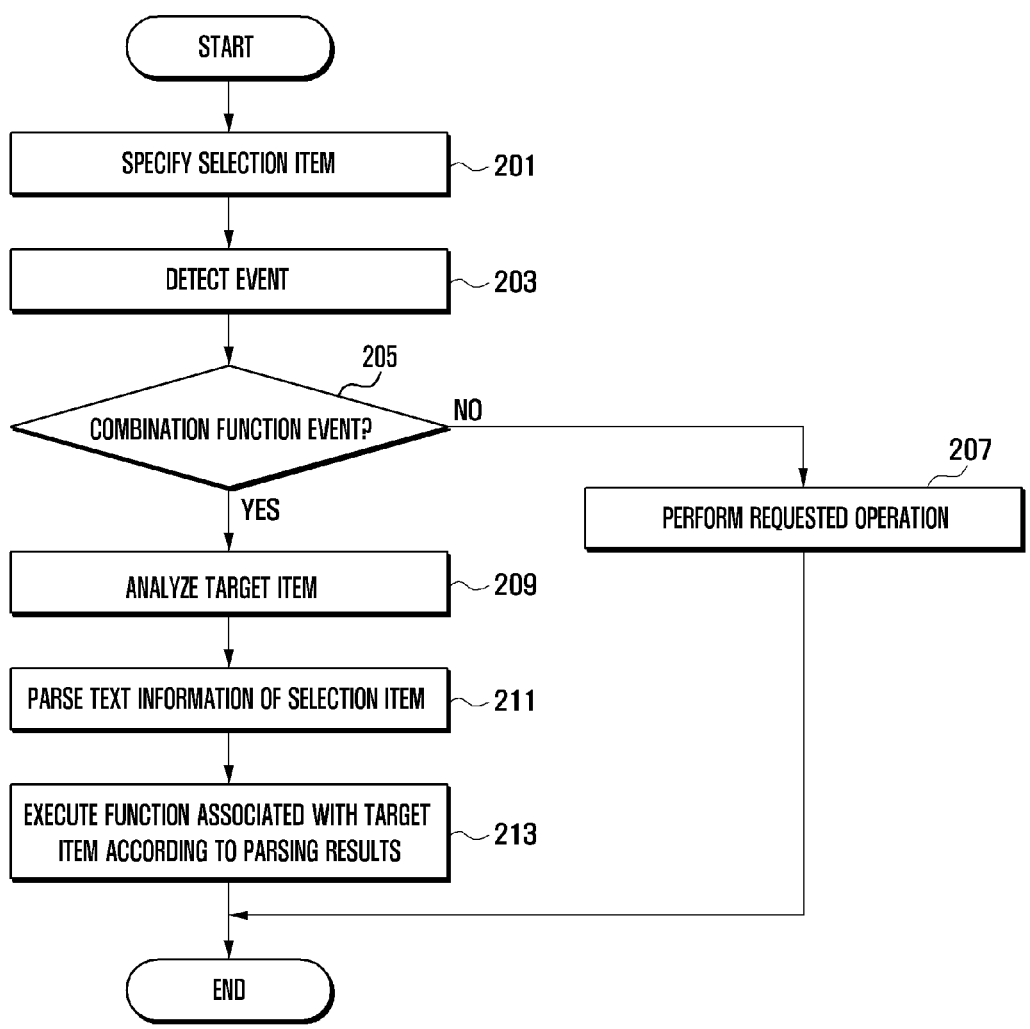
FIG. 2 is a flow chart of a function executing method based on a menu item combination according to another exemplary embodiment of the present invention.

FIG. 2 is a method illustrating a function executing method based on menu item combination according to another exemplary embodiment of the present invention.

Referring to FIG. 2, the control unit 160 of the mobile terminal 100 sets a selection item according to a user request (201). At step 201, selection of the selection item may be conducted. Various information from the user may be written in an input window (namely, a memo window). The input window is activated in response to a function execution request for the selection item.

The selection item may contain information prewritten by the user or the selection item does not contain any information. Hence, the activated input window may display prewritten information if present or the activated input window may be empty if no information is present or desired by the user. The user may then enter new information or may change existing information through the input window. Thus, the control unit 160 may provide the user with the input information in an intuitive way.

In an embodiment of the present invention, a selection item may be a memo item having a memo function. The user may input various information by activating the memo item. The information that may be input through the input window (namely, a memo window) is activated by the memo function. The information that is input may include numerals and characters in the native or English language.

For example, the input information may include a text string (e.g. "Hello"), an email address (e.g. "samsung@samsung.com"), a phone number (e.g. "010-5555-5555"), a Web address (e.g. "www.samsung.com"), a name or title (e.g. "Hongkildong", "Samsung", song title or movie title), and a specific date (in various formats "yyyy-mm-dd", "yyyy/mm/dd", "mm-dd" and "mm-dd-yy"). Data may also include a specific time or any other input data known in the art. Input data that may be written in selection items is generically referred to as text information.

Referring back to FIG. 2, the control unit 160 detects occurrence of a user event on the selection item (203). When a user event is detected on the selection item, the control unit 160 then determines whether the event is a combination function event that triggers function execution by menu item combination (205). More particularly, whether multiple functions are to be combined may also be included.

Combination function events may include a user gesture that directly moves a selection item to a target item. The user gesture on the touch screen 120 may include a move event, a drag event or a drag-and-drop event. The user gesture may select both a selection item and a target item such as a multi-touch event. The user gesture may select a selection item and a target item in sequence such as two consecutive tap events.

When the event is not a combination function event (step 205), the control unit 160 then performs an operation requested by the event (207). For example, the control unit 160 may store information input at step 201 as a new file, enter additional information, or erase existing information according to a user request. The control unit 160 may activate a submenu associated with the selection item or execute an associated function.

When the event is a combination function event, then the control unit 160 analyzes the target item addressed by the combination function event (209). The target item may be addressed by movement of the selection item, or by a multi-touch input. At step 209, the control unit 160 may identify the type of the target item addressed by a user gesture.

The control unit 160 parses the text information provided by the selection item according to the type of the target item (211). For example, when the target item is a transmission-related item such as a message item or a call item, then the control unit 160 may extract a phone number from the text information of the selection item. When the target item is a storage-related item such as a phonebook item, then the control unit 160 may extract a phone number, name, and mailing address (namely, data matching phonebook entry creation) from the text information of the selection item.

When the target item is a multimedia playback item such as a music playback item or a video playback item, the control unit 160 may then extract a specific title like a song title or a movie title from the text information. When the target item is an Internet-related item such as a browser item, then the control unit 160 may extract a Web address or a mail address from the text information. When the target item is a schedule, time or alarm-related item such as a schedule data or an alarm data, then the control unit 160 may extract a title, date value, and a time value from the text information. Various configurations are possible and within the scope of the present disclosure.

At step 211, the control unit 160 may extract various kinds of text segments from the text information on the basis of corresponding formats. For example, an email address may have a format of "samsung@samsung.com"; a phone number may have a format of "010-5555-5555"; a Web address may have a format like "www.samsung.com"; a date value may have a format of "yyyy-mm-dd" or "mm-dd"; and a time value may have a format of "hh:mm:ss". Various formats are possible and within the scope of the present disclosure.

The control unit 160 executes a function associated with the target item according to the parsed text information of the selection item (213).

Specifically, the control unit 160 may check the presence of a text segment matching the target item in the parsed text information. That is, the control unit 160 determines whether a text segment matches the target item that is extracted. For example, when the target item is a call item, the control unit 160 may check whether a phone number is extracted so the user can use the phone number to make a call.

When a text segment matching the target item is present in the parsed information, then the control unit 160 may execute a first function associated with the target item that uses the text segment. That is, the control unit 160 may control execution of a function associated with the target item on the basis of the parsed information. For example, when the target item is a message item and a phone number is extracted through parsing then the following may occur. The control unit 160 may then insert a part or all of the text information of the selection item in the body of a message. The control unit 160 may send the message using the extracted phone number as the recipient phone number. Examples of function execution by menu item combination are described in detail later.

When a text segment matching the target item is not present in the parsed information, then the control unit 160 may execute the second function. The second function is associated with the target item that uses the text information. For example, when the target item is a message item and a phone number matching the target item is not extracted through parsing, then the control unit 160 may compose a message. The message may use part or all of the text information of the selection item as the content of the message. Examples of function execution by menu item combination are described in detail herein.

Figure 3:
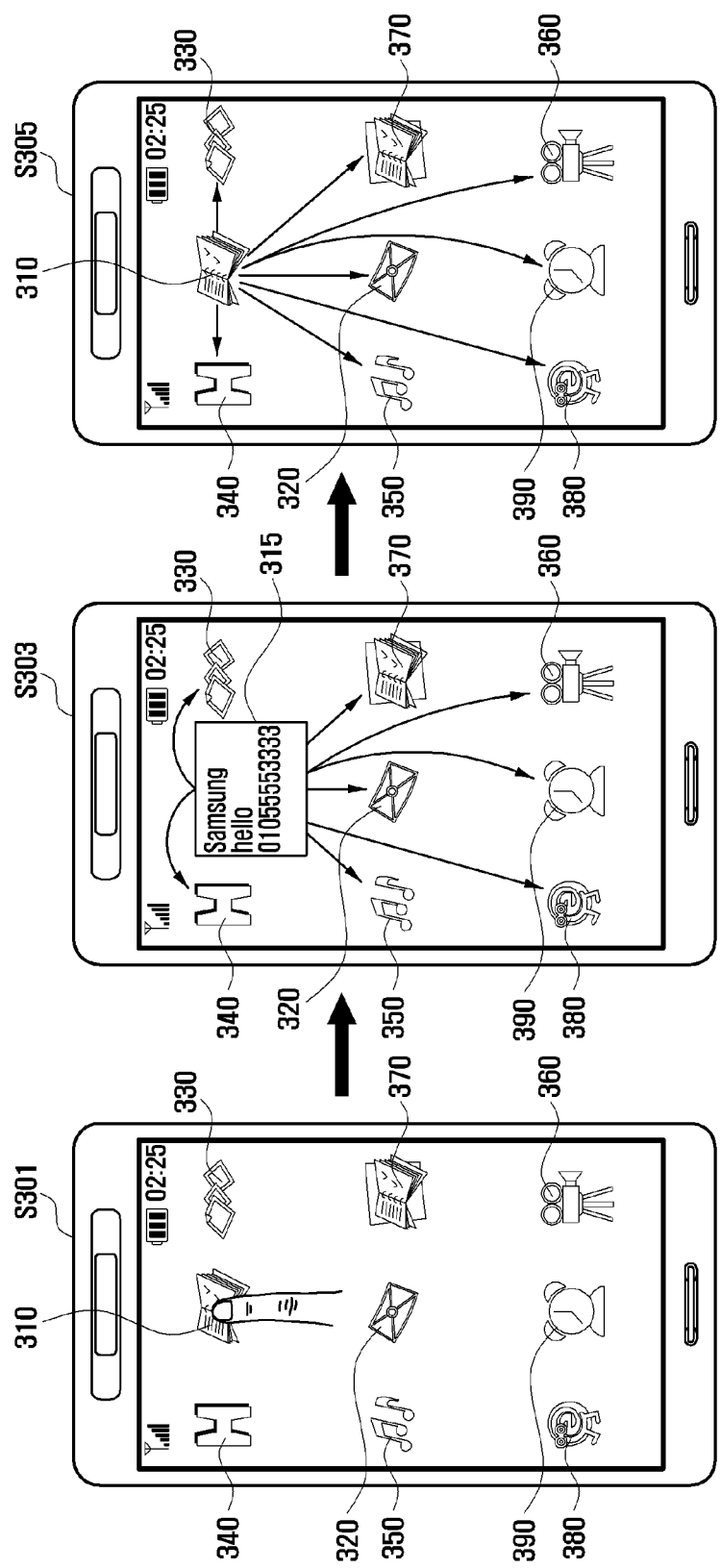
FIG. 3 shows a number of screen representations illustrating execution of a user function by combining menu items.

FIG. 3 is a touch screen representation wherein the input device is a display screen with the touch screen illustrates execution of a user function by combining at least two menu items.

Referring to FIG. 3, the control unit 160 of the mobile terminal 100 may provide menu items on the screen. The menu items may be according to a user request and shown by a presentation as menu items S301 and presentation menu items S303. The menu items form no limitations to the present invention and may vary depending on the mobile operating system or the like. The number and arrangement of memo items may be determined according to the screen size or the design, and may be changed later according to user settings. The memo item may be (i) a widget having a specific mapped function, (ii) an icon having a shortcut to a mapped function, or (iii) a combination of a widget and icon.

In FIG. 3, it is assumed that a menu item 310 is a selection item, and menu items 320 to 390 are target items. In FIG. 3 showing the progression, a memo window 315 is opened upon activation of the selection item 310 wherein the selection item 310 is a widget, and wherein the menu items 320 to 390 are widgets or icons having mapped functions or secondary submenus.

In FIG. 3, the selection item 310 is a memo item. The selection item 310 opens an input window (i.e., the memo window 315) when activated by a tap or the like. The target item 320 is a second icon or a message item having a message composition and transmission function and can be various icons. The target item 330 is a phonebook icon or item having a storage function for user information such as phone numbers and names. The target item 340 is a call icon or item having a call placing function for the mobile terminal 100. The target item 350 is a music playback icon or item having a playback function for multimedia based on music data. The target item 360 is a video player icon or item having a playback function for multimedia based on image data. The target item 370 is an organizer icon or item having a management function for schedules, calendars and deadlines. The target item 380 is a browser icon or item having an Internet access function. The target icon 390 is an alarm icon or item having a wake-up call or alarm function. In the following description, the music player item and video player item are generically referred to as a general "player item". That is, the mobile terminal 100 may receive music data and video data using the same player item.

Eight target items 320 to 390 are arranged on the screen in FIG. 3. However, the present invention is not limited to the display shown. The number, type and arrangement of target items may be varied according to user settings.

In FIG. 3, as shown by presentation S301, the user specifies a selection item or icon 310 for a function execution by a menu item combination. In an embodiment, as described before, the selection item 310 is a memo item. The user writes desired text information using the memo item and selects a target item having a second function to be executed according to the text information. Hence, the memo item 310 is specified as the selection item.

Next, the user enters an input command for activating the memo item 310 and application to write text information. The control unit 160 outputs a memo window 315. The memo window 315 is displayed upon activation of the memo item 310 as shown by presentation S303. The user may enter desired text information in the memo window 315. For example, the user may write text strings "Samsung", "hello" and "01055553333" in the memo window 315. When the memo item 310 has prewritten text information, then the memo window 315 may display the existing text information upon activation.

Next, the user combines the memo item 310 having new or existing text information with a target item. The target item has a function to be executed according to the text information. For example, as shown by presentation S301, when the selection item 310 has prewritten text information, then the user may specify the selection item 310. The user may then make a gesture for a target item combination (without writing new text information as in presentation S303). As shown by presentation S303, after writing text information in the memo window 315, the user may then select the memo window 315. The user may then make a gesture for target item combination. As shown by presentation S305, after closing the memo window 315, the user may specify the selection item 310. The selection item 310 may have text information. The text may be entered through the memo window 315 (as in presentation S303). The user may then form an input and make a gesture for target item combination.

As described before, the user gesture may correspond to any inputs including a drag event, drag-and-drop event, move event, multi-touch event, or single-touch event. The user gesture for target item combination is described later in connection with FIGS. 4 to 11.

Hereinafter, a description is provided of an execution of user functions by combining selection items with target items in the mobile terminal 100. However, the present invention is not limited to the flowing description, and various changes may be made for new embodiments and various input devices and terminals 100 may be provided and are within the scope of the present disclosure.

Figure 4:
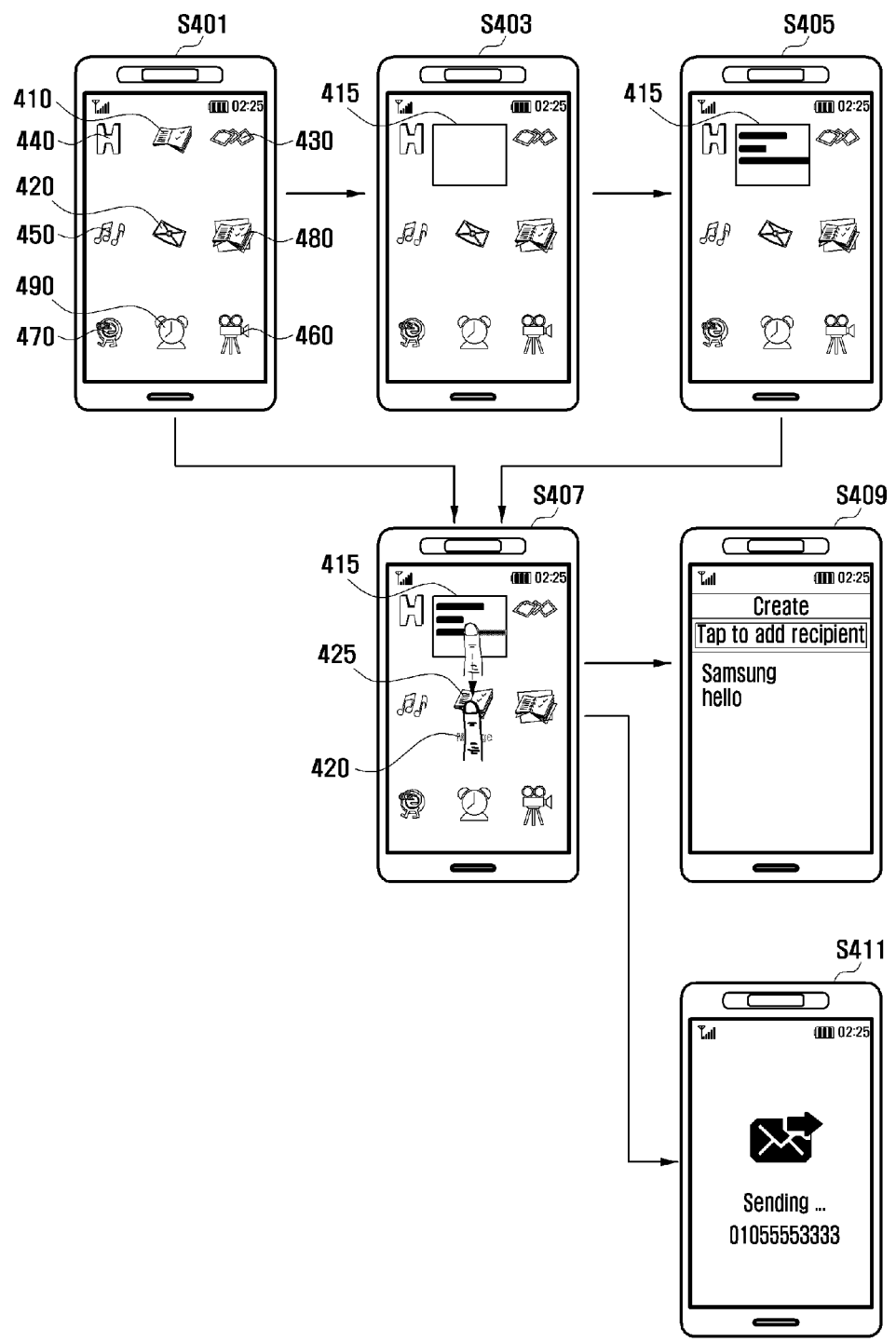
FIGS. 4 to 10 show a number of screen representations illustrating execution of functions by combining selection items with target items.

FIG. 4 shows screen representations illustrating execution of a user function by combining a memo item with a message item. In FIG. 4, a menu item 410 is a selection item. A memo window 415 is opened upon activation of the selection item 410. The menu items 420 to 490 are target items.

Referring to FIG. 4, the control unit 160 may provide a screen having menu items of a predetermined category. The menu items may be provided according to a user request as shown by presentation S401. For example, the control unit 160 may output an idle screen having a number of menu items. The number of provided menu items may vary according to the screen size or the design of the terminal 100. In the present embodiment, a menu item may be a selection item or a target item. One of the menu items that is initially selected by the user is referred to as a selection item. Another of the menu items or second menu item that is combined with the selection item which is moved by a user gesture is referred to as a target item. There may be two target items or more target items.

A menu item that is capable of storing user information may become a selection item. Examples of a selection item may include several items. For example, a selection item may be a memo item. The memo item can be an item wherein the user may enter various information using a memo function. The selection item may also be a message item. The message item is one which the user may enter various information using a message composition function. The message item may also comprise received information using a message reception function. A menu item can become a target item. The menu item generally has an associated function. The menu item may trigger an execution of an associated function according to user manipulation and the menu item may become a target item. Examples of a target item may include various items, which may be displayed. For example, the target items may include (i) a message item (having a message composition function), (ii) a phonebook item (having a user data input and storage function), (iii) a call item (having a call placing function for voice and video calls), (iv) a media player item (having a playback function for multimedia data including music data and image data), (v) a browser item (having a software application for Internet access functions), (vi) an organizer item (having a management function for schedules, calendars and deadlines), (vii) an alarm item (having an alarm function), (viii) a memo item (having a memo writing function) and other items depending on the software installed in the terminal 100.

In FIG. 4, the memo item 410 is shown as the selection item with the memo item 410 being combined with the message item 420 among the target items 420 to 490. In presentation S401 shown in the left, the user generates an input signal for activating the memo item 410 so the user may enter text information. That is, the user may make a gesture corresponding to a double tap event or a tap event on the memo item or icon 410. As in presentation S403, the control unit 160 activates the memo item 410 to open a memo window 415. The user may enter desired text information in the memo window 415 using various input techniques provided by the mobile terminal 100 as in presentation S405. In the event that the memo item 410 has stored prewritten information at presentation S401, then the memo window 415 may display the information upon activation of the memo item 410 as shown in presentation S405 before entering new data.

As shown in presentation S407, the user selects the memo window 415. The user may make a gesture or input of moving the memo window 415 to a target item that is combinable with the memo item 410 (i.e., a message item 420) having a different functionality. Here, the gesture or input may correspond to a drag event but the input is not limited to a drag input. When the memo window 415 is moved and placed on the message item 420, then the user makes a gesture of a function execution. This is accomplished by a selection and target item combination (i.e., function execution by combination of the memo item 410 with the message item 420). Here, the gesture may correspond to a drop event or input but is not limited to the input.

As in presentation S407, the user may make a gesture of drag-and-drop or input that drags the memo window 415 and drops the memo window 415 on the message item 420. Reference symbol 425 shows a virtual item of the memo window 415 or the selection item 410. The virtual item of the memo window 415 may provide a visual effect. This enables the user to intuitively recognize movement of the selection item 410 or memo window 415. The visual effect may be a trail or indication and may represent movement caused by a user gesture.

In the above description, the memo window 415 is moved and combined with the message item 420. However, the present invention is not limited to the above embodiment. For example, when the selection item 410 has prewritten information in the presentation S401, then the user may make a gesture of directly combining the selection item 410 with the message item 420. In presentation S405, the user may close the memo window 415. This can be performed after entering information and by making a gesture of combining the memo item 410 (as the selection item) with the message item 420.

Thereafter, the control unit 160 identifies when the selection item 410 or memo window 415 is dropped on the message item 420. Thereafter, a function that is executable by combination of the selection item 410 or memo window 415 with the message item 420 is performed and the control unit 160 then immediately executes the identified function to provide convenience to the user.

FIG. 4 shows that a function, which is mapped to the message item 420 (the target item) is executed according to the information contained in the selection item 410. When a gesture of combining a selection item with a target item is made, then the control unit 160 analyzes the target item to determine a type. That is, the control unit 160 may determine the type and function of the target item. For example, a gesture is made combining the selection item 410 with the message item 420. The control unit 160 then analyzes the type of the message item 420. Here, the control unit 160 may identify a function mapped to the message item 420. The control unit 160 may recognize the message item 420 as having a messaging function.

The control unit 160 parses the text information of the selection item 410. The control unit 160 then extracts a text segment matching the messaging function. For example, the control unit 160 may extract a phone number from the text information.

When a phone number is not extracted, then the control unit 160 may perform message composition as a messaging function. This may be accomplished as shown in presentation S409. Here, the control unit 160 may insert the text information of the selection item 410. This text information of the selection item 410 may be inserted in the body of a message.

When a phone number is extracted, then the control unit 160 may conduct message transmission. This message transmission may be accomplished as a messaging function and is shown in presentation S411. The control unit 160 may send a message containing the text information to a recipient. The recipient is indicated by the extracted phone number or by other data.

For a function execution by a selection and a target item combination, the selection item 410 is moved and combined. The selection item 410 is combined with the target item (i.e., the message item 420) by a user gesture. This may correspond to an input such as corresponding to a drag-and-drop event. Alternatively, the user may make a gesture corresponding to a multi-touch event. This multi-touch event may correspond to touching the selection item 410 and touching the message item 420 while the selection item 410 is being touched. This may correspond to a different input know in the art.

FIG. 4 shows a memo item as the selection item and a message item as the target item. Upon combining the memo item with the message item, the message composition or the message transmission is conducted according to the parsed text information. The parsed text information may correspond to the memo item. In an embodiment, the user functions that are executable through menu item combination may be set in various ways. These can be set according to the design or user settings. Table 1 shows a list of user functions executable through menu item combination.

TABLE 1

| Selection item | Target item | Executed function |
| --- | --- | --- |
| Any menu item capable of accepting or storing information (widgets, icons) | Message item<br>Phonebook item<br>Call item<br>Player item<br>Browser item<br>Organizer item<br>Alarm item | Messaging<br>Data entry creation<br>Placing a call<br>Multimedia playback<br>Internet access<br>Schedule management<br>Alarm generation |

Referring to Table 1, any menu item capable may be specified as the selection item. This may include receiving or storing text information (for example, a memo item or message item). For a selection item, any menu item that is combinable with the selection item may also be specified as a target item. The selection and target items may be widgets and/or icons. The selection and target items may be set in various ways according to user selection. The function to be executed by selection and target item combination may be set. These can be set as functions associated with a target item that matches certain criteria. In one embodiment, these can be set as the text information contained in the selection item. The user may change settings related to function execution by selection and target item combination.

Next, a description is provided of interaction between the selection item and the target item with reference to Table 1. In an embodiment, when a request for combining the selection item with the target item (such as a drag-and-drop event or multi-touch event) is made then a text segment matching the type of the target item is located. This can be located in the text information of the selection item through parsing. Thereafter, a function associated with the target item is executed according to the parsing results.

For example in Table 1, when a memo item (selection item) is combined with a message item (target item), then a function may be executed. For example a memo can be combined with a message. When a memo item (selection item) is combined with a message item (target item), then a message composition function or a message transmission function may be executed for providing an email message or word processor function. Whether the message composition function or the message transmission function is executed may be determined according to the parsing results. The parsing results may be obtained with the text information contained in the memo item. For instance, when a phone number is not present in the text information, then the control unit 160 may execute the message composition function. The message composition function may be performed by outputting a message composition screen containing the text information. When a phone number is present in the text information, then the control unit 160 may execute the message transmission function. The control unit 160 may add the text information to the message body and then use the phone number as the recipient address.

Relations between the selection item, the target item, and the executed function are not necessarily limited to the entries of Table 1. The user may change, add, or delete entries in Table 1. The user may also download such relations from a suitable server such as the manufacturer server.

Next, a description is provided of an embodiment in which the selection item is set to a memo item that serves as a widget. However, the selection item is not limited to a memo item serving as a widget. Various changes may be made to an embodiment described below.

Figure 5:
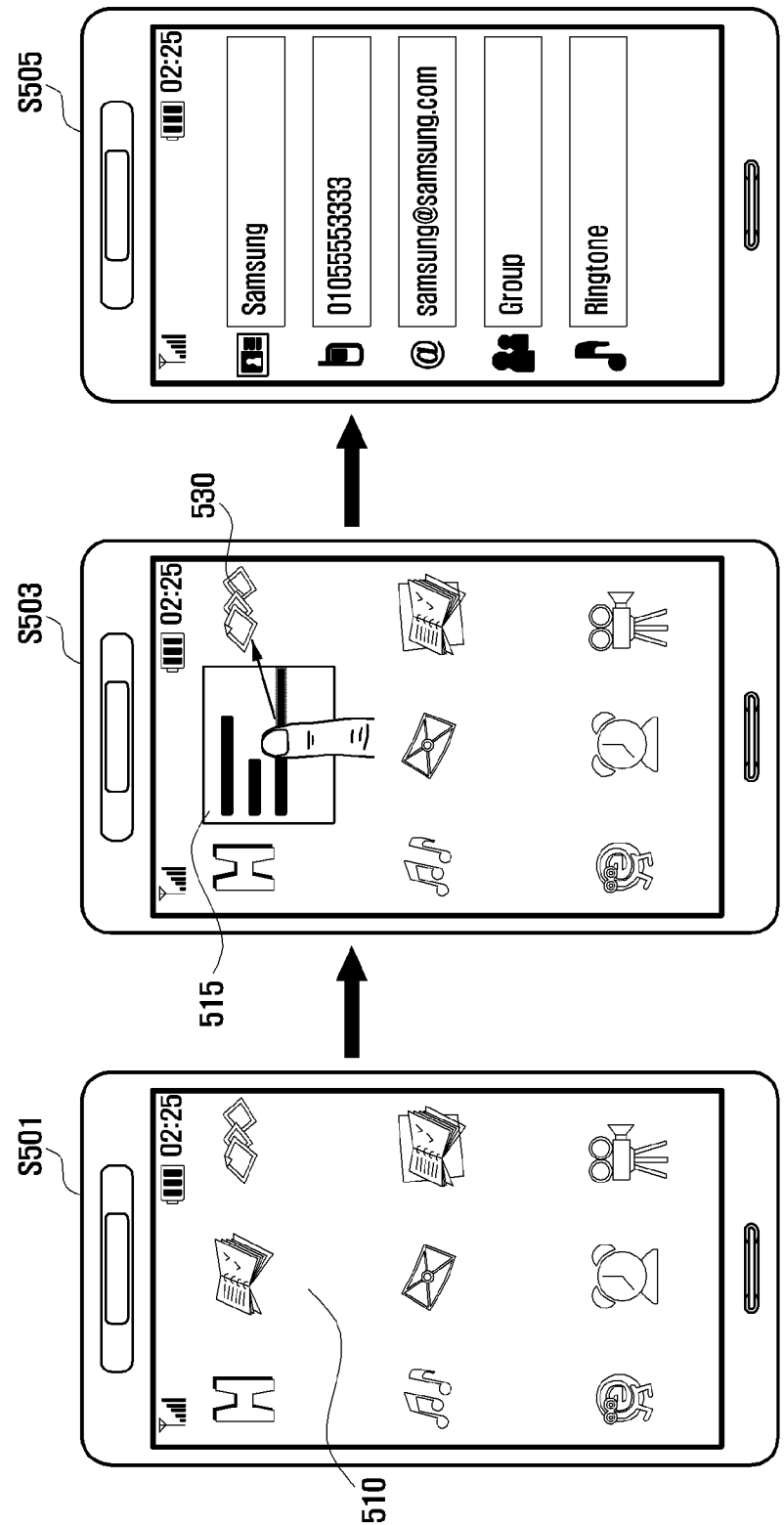

FIG. 5 shows screen representations illustrating execution of a user function by combining a memo item with a phonebook item. In FIG. 5, a memo item 510 is shown as the selection item. A memo window 515 is opened upon activation of the selection item 510. FIG. 5 also shows a phonebook item 530 as the target item.

Referring to FIG. 5, the control unit 160 may provide a screen. The screen has menu items of a predetermined category according to a user request as shown in presentation S501. In presentation S501, the user generates an input signal for activating the memo item 510. As in presentation S503, the control unit 160 then activates the memo item 510 to open a memo window 515.

The user may enter desired text information in the memo window 515. For example, the user may enter text information. The text can be composed of text segments such as a phone number "01055553333", an email address "samsung@samsung.com", and a user name "Samsung".

As in presentation S503, the user then selects the memo window 515. The user then makes a gesture of moving the memo window 515 to the phonebook item 530. The phonebook item 530 or icon also is the target item. For example, the user may drag the memo item 510 or the memo window 515. The user may then drop the memo item 510 or the memo window 515 on the phonebook item 530 or icon using the touch screen or a different input device. Although not shown, a virtual item of the memo item 510 may be provided. The virtual item can be a visual effect that enables the user to intuitively recognize movement of the memo item 510 or memo window 515 for example using a faint display or streak.

The control unit 160 parses text information of the memo item 510. The parsing occurs when the memo item 510 or memo window 515 is dragged and dropped on the phonebook item 530. More specifically, the control unit 160 identifies the type of the target item. The control unit identifies the type when the memo item 510 or memo window 515 is dragged and dropped on the phonebook item 530. The control unit 160 recognizes the phonebook item 530 as the target item. The control unit 160 then parses the text information of the memo item 510. This is accomplished to locate a text segment matching the phonebook item 530.

In particular, when the phonebook item 530 is recognized as the target item, then the control unit 160 extracts a text segment. This corresponds to a phone number, mailing address, name, or Web address. The text segment is from the text information of the memo item 510. The control unit 160 creates a phonebook entry using at least one extracted text segment. The control unit 160 then outputs a phonebook setting screen as shown in presentation S505. Here, the control unit 160 inserts the extracted text segments. The extracted text segments are input in corresponding fields of the phonebook setting screen as shown in presentation S505. When no text segment corresponding to a field is extracted, then the field may be left empty. According to user settings, when the memo item 510 is combined with the phonebook item 530, then the control unit 160 may create a phonebook entry. The entry can be accomplished using the extracted text segments. The control unit 160 then directly adds the phonebook entry to the phonebook stored in memory without outputting a phonebook setting screen as shown in presentation S505. This is very convenient for the user as the user does not have to navigate menus.

Figure 6:
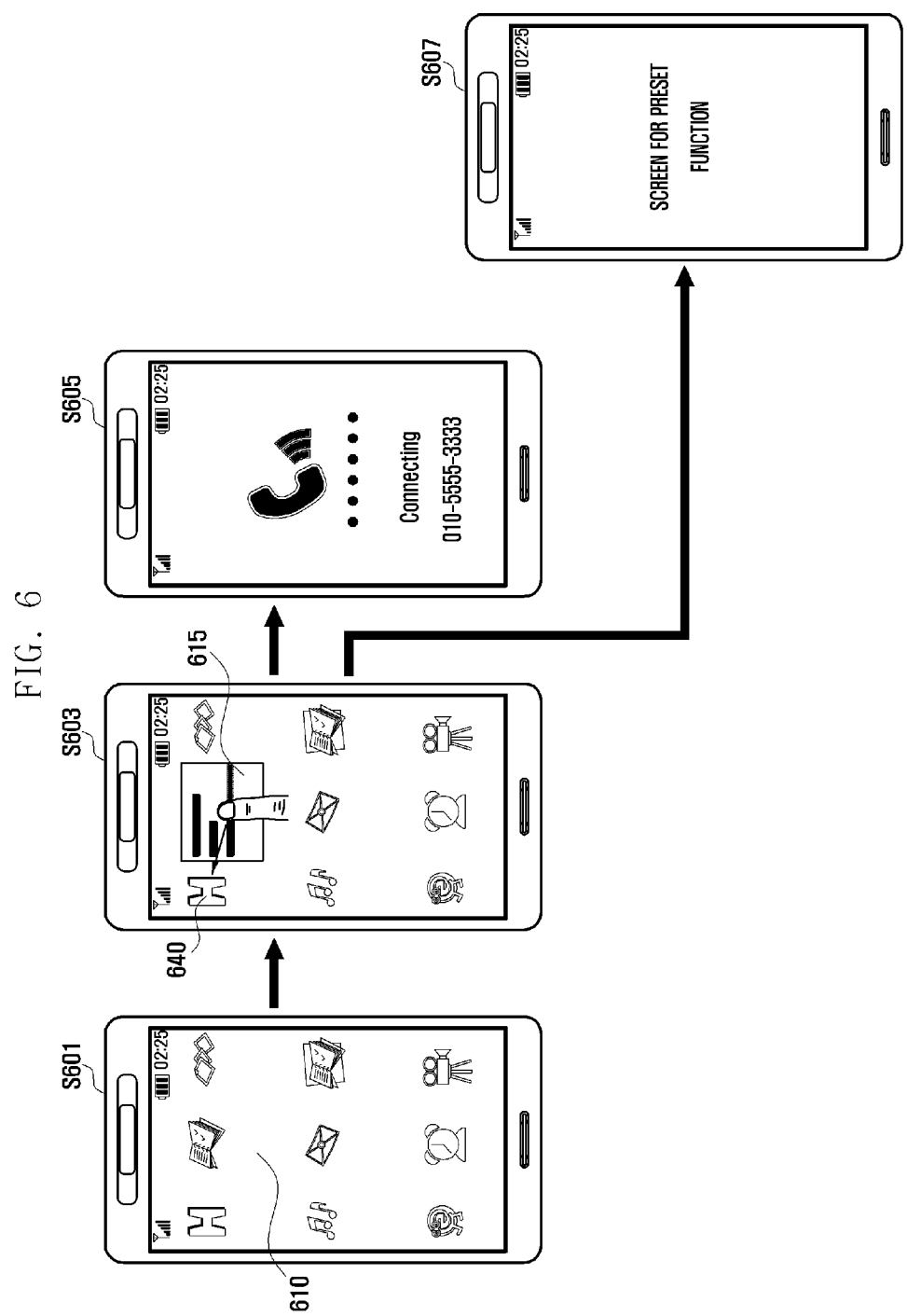

FIG. 6 shows screen representations illustrating execution of a user function by combining a memo item with a call item. In FIG. 6, a memo item 610 is the selection item. A memo window 615 is opened upon activation of the selection item 610. A call item 640 is the target item.

Referring to FIG. 6, the control unit 160 may provide a screen. The screen has menu items of a predetermined category according to a user request as in presentation S601. In presentation S601, the user generates an input signal. The input activates the memo item 610. As shown in presentation S603, the control unit 160 activates the memo item 610 to open a memo window 615.

The user may enter desired text information in the memo window 615. For example, the user may enter text information composed of text segments such as a phone number, name, email address, and Web address.

As in presentation S603, the user selects the memo window 615. The user makes a gesture of moving the memo window 615 to the call item 640. The call item 640 is the target item. For example, the user may drag the memo item 610 or the memo window 615 and drop the memo item 610 or the memo window 615 on the call item 640. Although not shown, a virtual item of the memo item 610 may be provided. The virtual item can be provided as an indicator or as a visual effect. The virtual item enables the user to intuitively recognize movement of the memo item 610 or memo window 615 and can be a streak or an icon or the like.

The control unit 160 parses text information of the memo item 610. The parsing occurs when the memo item 610 or memo window 615 is dragged and dropped on the call item 640. More specifically, the control unit 160 identifies the type of the target item. The type is identified when the memo item 610 or memo window 615 is dragged and dropped on the call item 640. The control unit 160 recognizes the call item 640 as the target item. Control unit 160 then parses the text information of the memo item 610. Control unit 160 thus locates a text segment matching the call item 640.

In particular, when the call item 640 is recognized as the target item, then the control unit 160 extracts a text segment. The text segment corresponds to a phone number from the text information of the memo item 610. When a phone number is extracted, then the control unit 160 places a call. The call is placed using the extracted phone number. The control unit 160 then outputs a call screen as in presentation S605. Here, the control unit 160 may display the extracted phone number on the screen. This visually notifies the user of a call placement based on the extracted phone number.

When a phone number is not extracted, then the control unit 160 outputs a screen. The screen is related to a preset function as shown in presentation S607. For instance, the control unit 160 may output a screen having a list of recent calls. The control unit 160 may also alternatively output a screen requesting phone number input.

Figure 7:
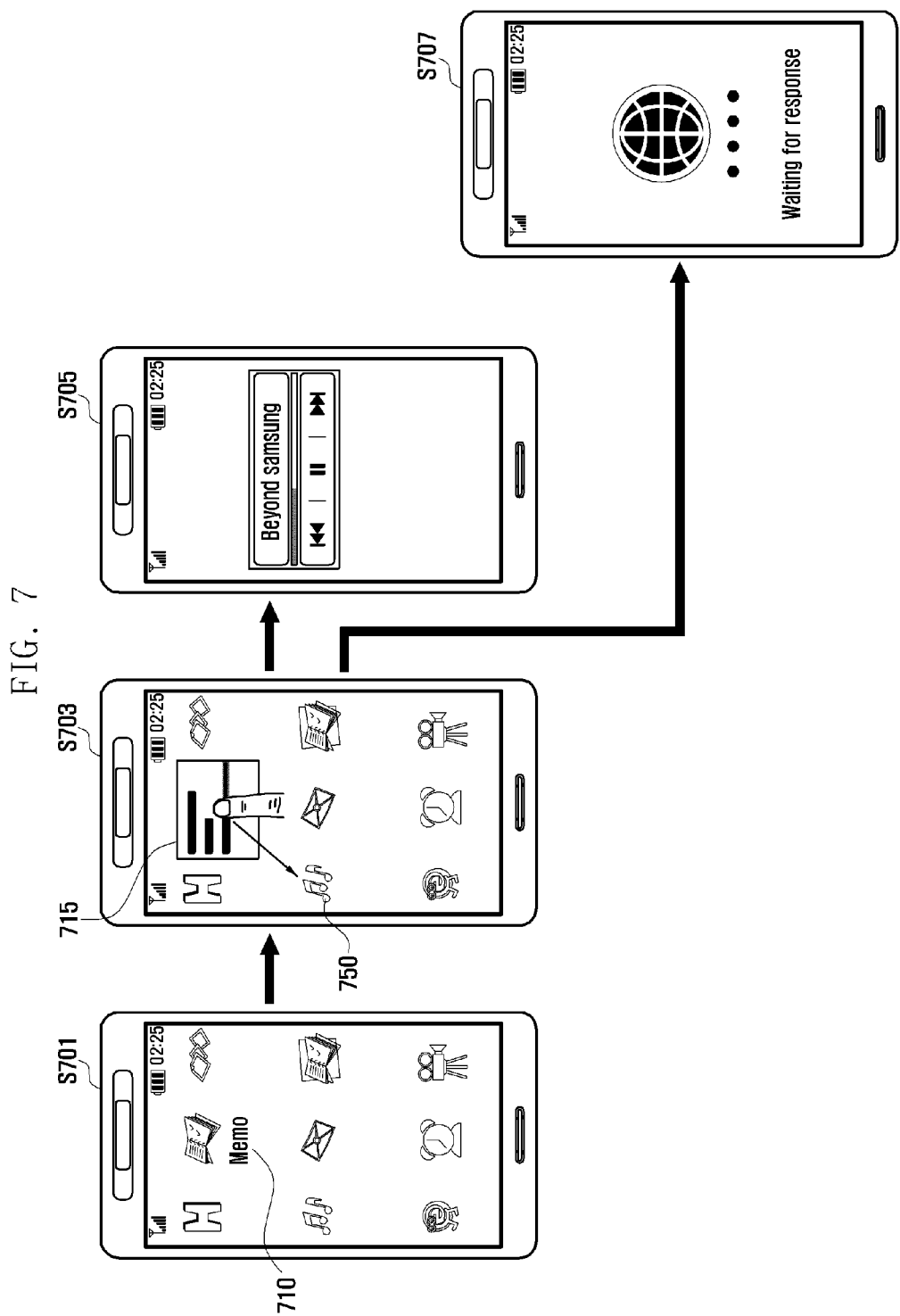

FIG. 7 shows a screen representation illustrating execution of a user function by combining a memo item with a media player item. In FIG. 7, a memo item 710 is the selection item. A memo window 715 is opened upon activation of the selection item 710. A media player item 750 is the target item. Although the player item 750 is depicted as a music player item, it may act as a music player item, a video player item, or as a video player item or any other software application to view data.

Referring to FIG. 7, the control unit 160 may provide a screen having menu items of a predetermined category according to a user request as in presentation S701. In presentation S701, the user generates an input signal. The input signal is used for activating the memo item 710. As shown in presentation S703, the control unit 160 activates the memo item 710 to open a memo window 715.

The user may enter desired text information in the memo window 715. For example, the user may enter text information composed of at least one text segment. The text segment may correspond to a title such as a song title, a media title, or movie title.

As in presentation S703, the user selects the memo window 715. The user then makes a gesture of moving the memo window 715 to the player item 750. The player item 750 is the target item. For example, the user may drag the memo item 710 or the memo window 715 and drop the memo item 710 or the memo window 715 on the player item 750. Although not shown, a virtual item of the memo item 710 may be provided as a visual effect. This enables the user to intuitively recognize movement of the memo item 710 or movement of the memo window 715. In particular, it is assumed that the player item 750 is capable of playing back or outputting music files, video files, and audio/visual files in the appropriate format for listening and viewing on the display and on the audio device. That is, the player item 750 is assumed to be a composite player item. The player item 750 is thus capable of playing back both audio files and video files.

The control unit 160 parses text information of the memo item 710. This occurs when the memo item 710 or memo window 715 is dragged and dropped on the player item 750. More specifically, the control unit 160 identifies the type of the target item. This identification occurs when the memo item 710 or memo window 715 is dragged and dropped on the player item 750. The control unit 160 recognizes the player item 750 as the target item. Control unit 160 then parses the text information of the memo item 710 to locate a text segment matching the player item 750.

In particular, when the player item 750 is recognized as the target item, then the control unit 160 extracts a text segment. The text segment corresponds to a title phrase from the text information of the memo item 710. A title phrase may be identified by separator symbols. The title phrase can be a character such as a blank and new line character, and may correspond to a song title or movie title.

When a title phrase is extracted, the control unit 160 searches the storage unit 150. The search is for multimedia data matching the title phrase. The control unit 160 then plays back the found multimedia data and the control unit 160 then provides a playback screen as in presentation S705. Here, the control unit 160 may display the extracted title phrase on the screen. This phrase visually notifies the user of multimedia playback based on the title phrase.

When multimedia data matching the title phrase is not found in the storage unit 150, then the control unit 160 connects to the Internet. Control unit 160 preferably finds multimedia data matching the title phrase as shown in presentation S707. Thereafter, the control unit 160 may download the found multimedia data. The control unit 160 may then store the downloaded multimedia data in the storage unit 150 for playing back the downloaded multimedia data.

Figure 8:
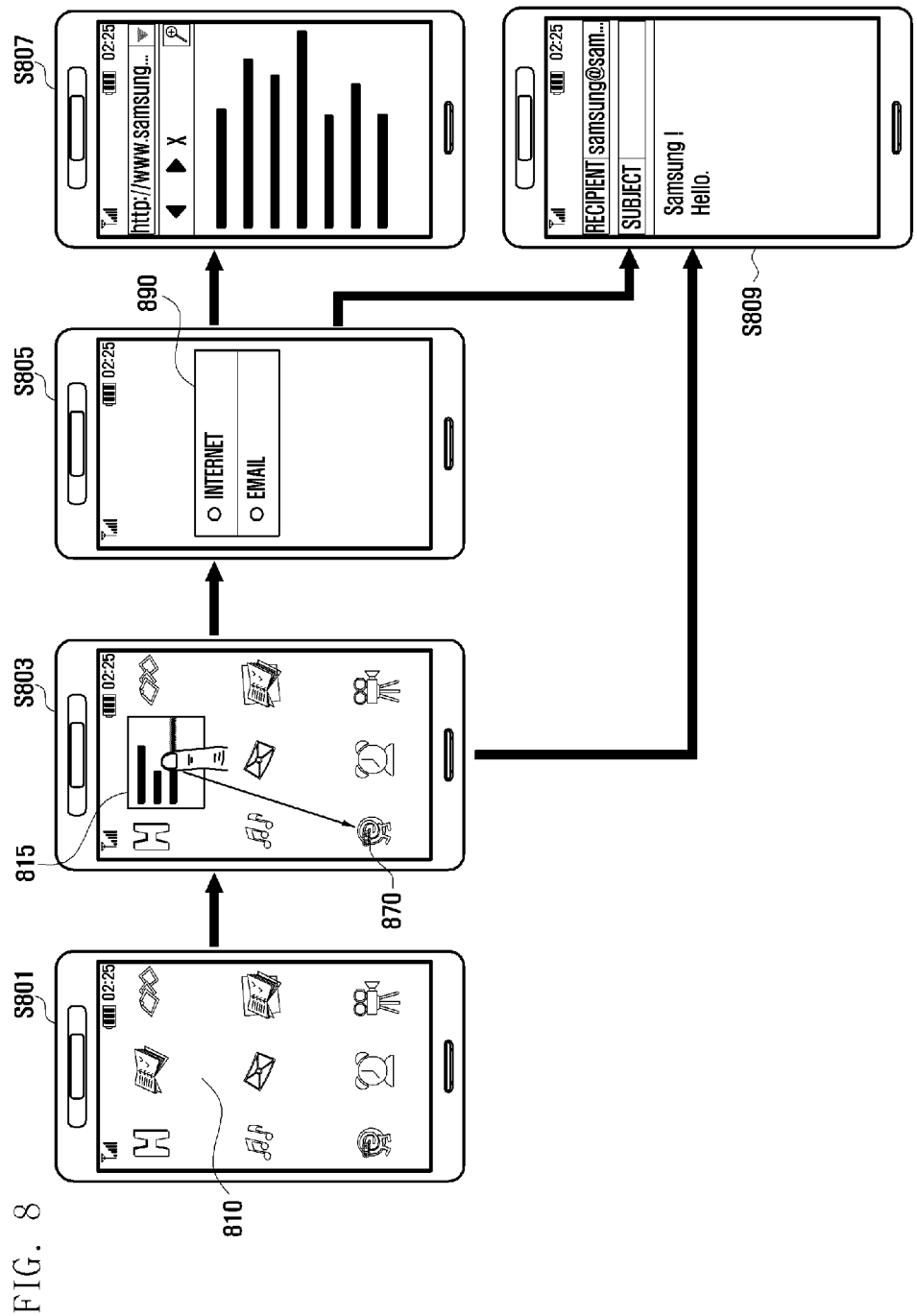

FIG. 8 is a number of screen representations illustrating execution of a user function by combining a memo item with a browser item. In FIG. 8, a memo item 810 is the selection item. A memo window 815 is opened upon activation of the selection item 810. A browser item 870 is the target item. Referring to FIG. 8, the control unit 160 may provide a screen. The screen has a number of menu items of a predetermined category according to a user request as shown in presentation S801.

In presentation S801, the user generates an input signal for activating the memo item 810. As in presentation S803, the control unit 160 activates the memo item 810 to open a memo window 815. The user may enter desired text information in the memo window 815. For example, the user may enter text information. Text may be composed of text segments such as an email address and Web address.

As in presentation S803, the user selects the memo window 815. The user makes a gesture of moving the memo window 815 to the browser item 870. The browser item 870 is the target item. For example, the user may drag the memo item 810 or the memo window 815 and drop the memo item 810 or the memo window 815 on the browser item 870. Although not shown, a virtual item of the memo item 810 may be provided as a visual effect showing the above. The visual effect preferably enables the user to intuitively recognize movement of the memo item 810 or memo window 815 as discussed above.

The control unit 160 parses text information of the memo item 810. This occurs when the memo item 810 or memo window 815 is dragged and dropped on the browser item 870. More specifically, the control unit 160 identifies the type of the target item. The identification is when the memo item 810 or memo window 815 is dragged and dropped on the browser item 870. The control unit 160 recognizes the browser item 870 as the target item. Control unit 160 then parses the text information of the memo item 810. The parsing is to locate a text segment matching the browser item 870.

In particular, when the browser item 870 is recognized as the target item, then the control unit 160 extracts a text segment. The text segment corresponds to a Web address or a mailing address from the text information of the memo item 810. Thereafter, the control unit 160 may perform a browser function corresponding to the extracted text segment.

For example, when a Web address is extracted, then the control unit 160 may connect to the website indicated by the Web address. The control unit 160 may provide a corresponding screen as shown in presentation S807. In particular, when a title phrase is also extracted from the text information, then the control unit 160 may conduct a search in the connected website. The search may be conducted using the title phrase as a search word. When an email address is extracted, as shown in presentation S809, then the control unit 160 may execute a mailing function. This mailing function provides a mail composition screen. The screen of the mailing function uses the extracted email address and the text information respectively as the recipient address and mail contents.

When both a Web address and an email address are extracted, then the control unit 160 may provide a popup window 890. Popup window 890 requests an input such as a function selection. The function selection can be shown in presentation S805. The user may select a desired one of functions listed in the popup window 890. The control unit 160 may perform website access as shown in presentation S807. Control unit 160 may alternatively perform a mailing function as shown in presentation S809 according to the user selection.

Figure 9:
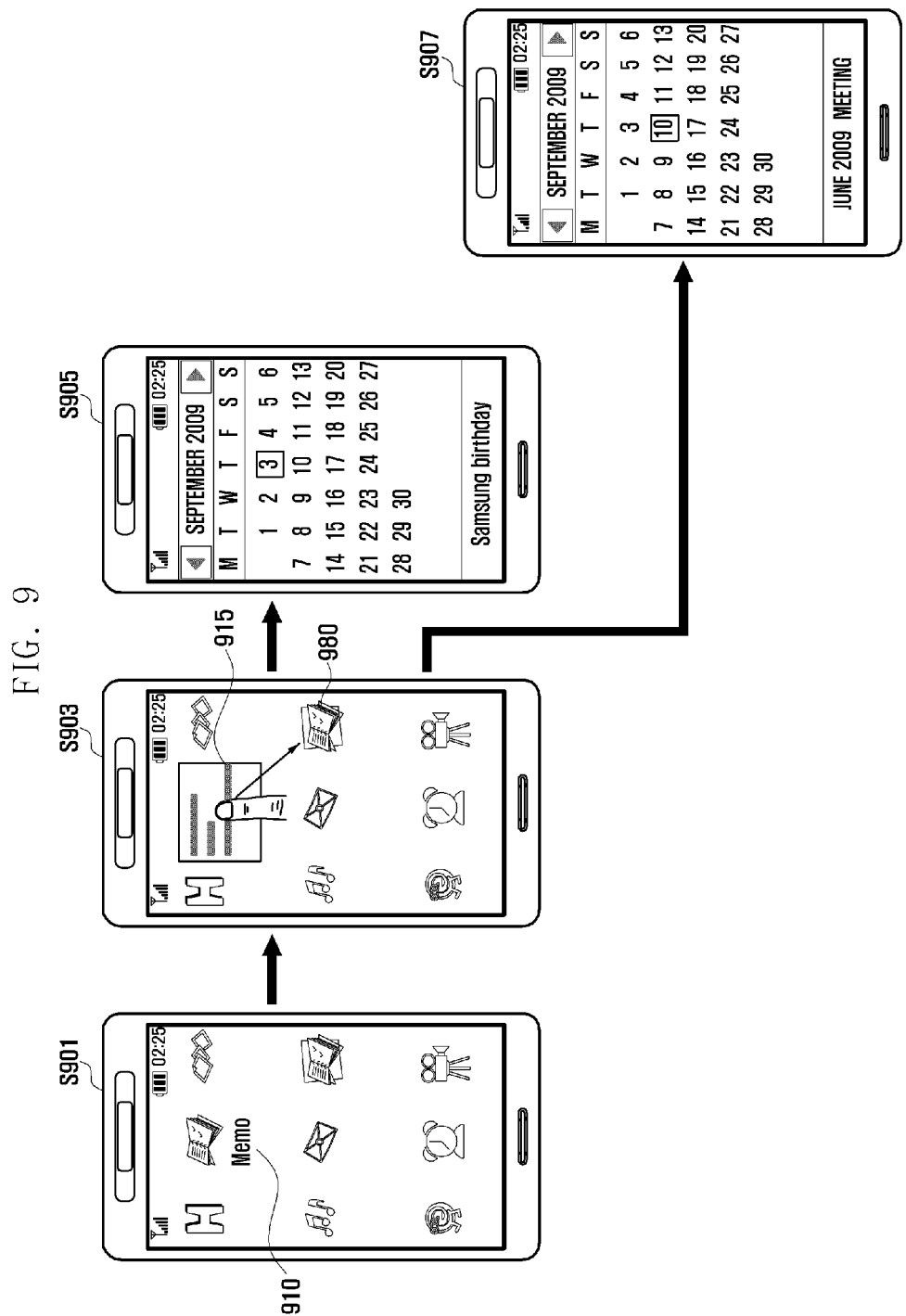

FIG. 9 shows screen representations illustrating execution of a user function by combining a memo item with an organizer item. In FIG. 9, a memo item 910 is the selection item. A memo window 915 is opened upon activation of the selection item 910. An organizer item 980 is the target item.

Referring to FIG. 9, the control unit 160 may provide a screen having menu items of a predetermined category according to a user request as shown in presentation S901. In presentation S901, the user generates an input signal. The input signal is for activating the memo item 910. As shown in presentation S903, the control unit 160 activates the memo item 910. This signal opens a memo window 915.

The user may enter desired text information in the memo window 915. For example, the user may enter text information. The text may be composed of text segments such as a date value and time value. As shown in presentation S903, the user selects the memo window 915. The user makes a gesture of moving the memo window 915 to the organizer item 980. The organizer item 980 is the target item. For example, the user may drag the memo item 910 or the memo window 915 and drop the memo item 910 or the memo window 915 on the organizer item 980. Although not shown, a virtual item of the memo item 910 may be provided. This provides a visual effect that enables the user to intuitively recognize movement of the memo item 910 or memo window 915.

The control unit 160 parses text information of the memo item 910. Parsing occurs when the memo item 910 or memo window 915 is dragged and dropped on the organizer item 980. More specifically, the control unit 160 identifies the type of the target item. This identification occurs when the memo item 910 or memo window 915 is dragged and dropped on the organizer item 980. The control unit 160 recognizes the organizer item 980 as the target item. The control unit 160 then parses the text information of the memo item 910 to locate a text segment generally matching the organizer item 980.

In particular, when the organizer item 980 is recognized as the target item, then the control unit 160 extracts a text segment. The text segment corresponds to a date value, a time value, or a special event from the text information of the memo item 910. Thereafter, the control unit 160 may perform a schedule management function. The schedule management function may be according to the extracted text segment.

For example, when a date value, for example, "2009.09.03" and an event phrase, for example, "Samsung Birthday" are extracted, then the control unit 160 may provide a calendar screen. The calendar screen preferably has the event phrase with a mark on the corresponding date as shown in presentation S905.

When a time value "PM 3:00" and an event phrase "Meeting" are extracted, then the control unit 160 may display a calendar screen. The calendar screen has the planned time and event phrase with a mark on the current date (for example, 2009-06-10) as shown in presentation S907.

Figure 10:
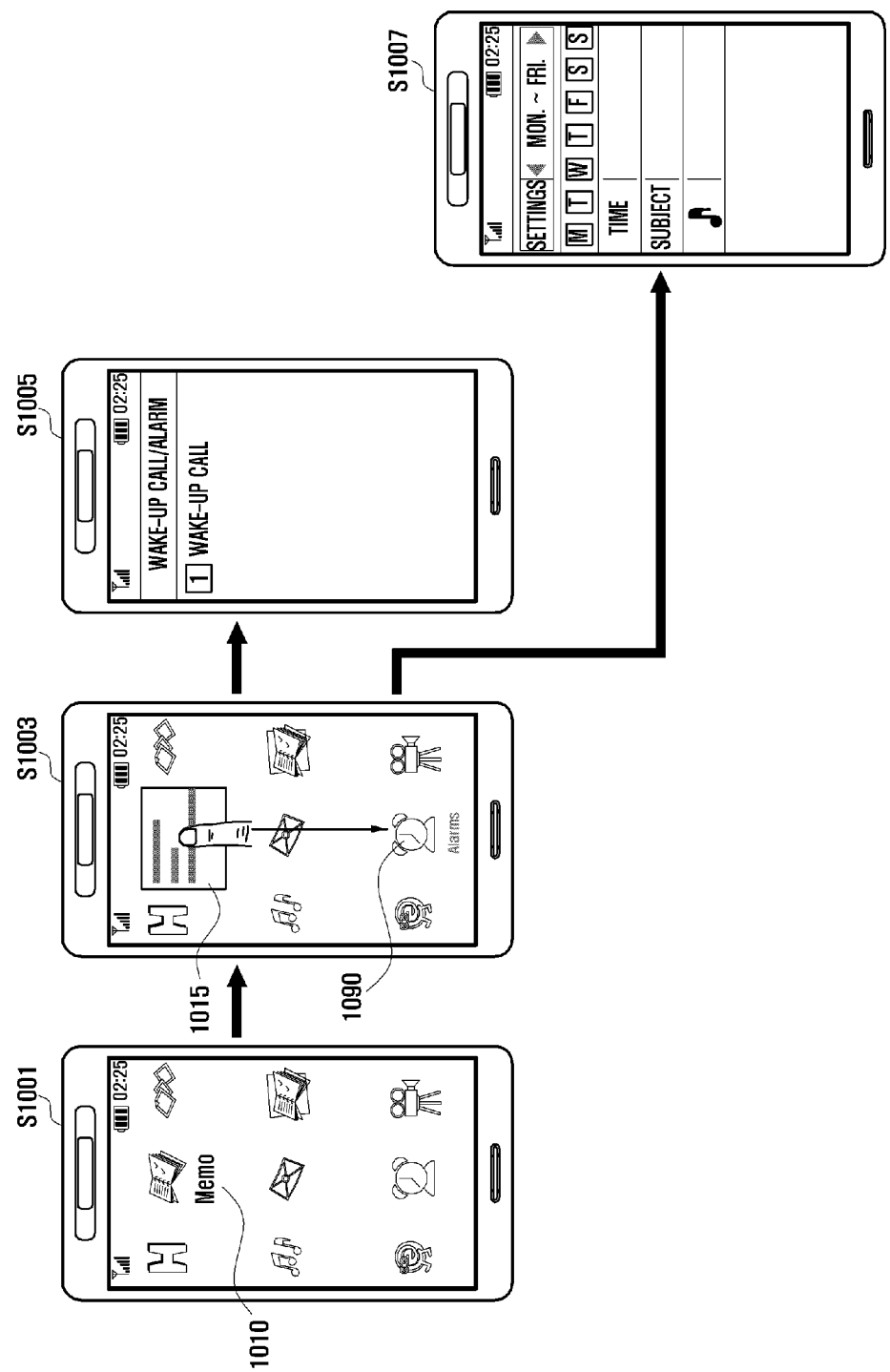

FIG. 10 shows a screen representation illustrating execution of a user function by combining a memo item with an alarm item. In FIG. 10, a memo item 1010 is the selection item. A memo window 1015 is opened upon activation of the selection item 1010. An alarm item 1090 is the target item. Referring to FIG. 10, the control unit 160 may provide a screen having menu items of a predetermined category according to a user request as shown in presentation S1001.

In presentation S1001, the user generates an input signal for activating the memo item 1010. As shown in presentation S1003, the control unit 160 activates the memo item 1010. This opens a memo window 1015.

The user may enter desired text information in the memo window 1015. For example, the user may enter text information. The text may include at least one of a text segment corresponding to a day value, a date value, or a time value.

As shown in presentation S1003, the user selects the memo window 1015. The user then makes a gesture of moving the memo window 1015 to the alarm item 1090. The alarm item 1090 is the target item. For example, the user may drag the memo item 1010 or the memo window 1015 and drop the memo item 1010 or the memo window 1015 or combined icon on the alarm item 1090. Although not shown, a virtual item of the memo item 1010 may be provided as a visual effect. This indication enables the user to intuitively recognize movement of the memo item 1010 or memo window 1015.

The control unit 160 then parses text information of the memo item 1010. This occurs when the memo item 1010 or memo window 1015 is dragged and dropped on the alarm item 1090. More specifically, the control unit 160 identifies the type of the target item. This identification occurs when the memo item 1010 or memo window 1015 is dragged and dropped on the alarm item 1090. The control unit 160 recognizes the alarm item 1090 as the target item. The control unit 160 then parses the text information of the memo item 1010 to locate a text segment matching the alarm item 1090.

In particular, when the alarm item 1090 is recognized as the target item, then the control unit 160 extracts a text segment. The text segment corresponds to a day value, a date value, or a time value from the text information of the memo item 1010. Thereafter, the control unit 160 may perform an alarm function. The alarm function corresponds to the extracted text segment and the alarm may ring at the time value.

For example, when a time value "AM 6:00" is extracted, then the control unit 160 may set a wake-up call at AM 6:00. The control unit 160 may then output a signal to display a wake-up call/alarm screen as shown in presentation S1005.

When a day value "Mon/Wed/Fri" and a time value "AM 6:00" are extracted, then the control unit 160 may set a wake-up alarm at AM 6:00 on Monday, Wednesday and Friday. The control unit 160 may then display a corresponding screen.

When no text segment matching the alarm item 1090 is extracted, then the control unit 160 may display a screen. The screen is for setting wake-up calls and alarms as shown in presentation S1007.

Figure 11:
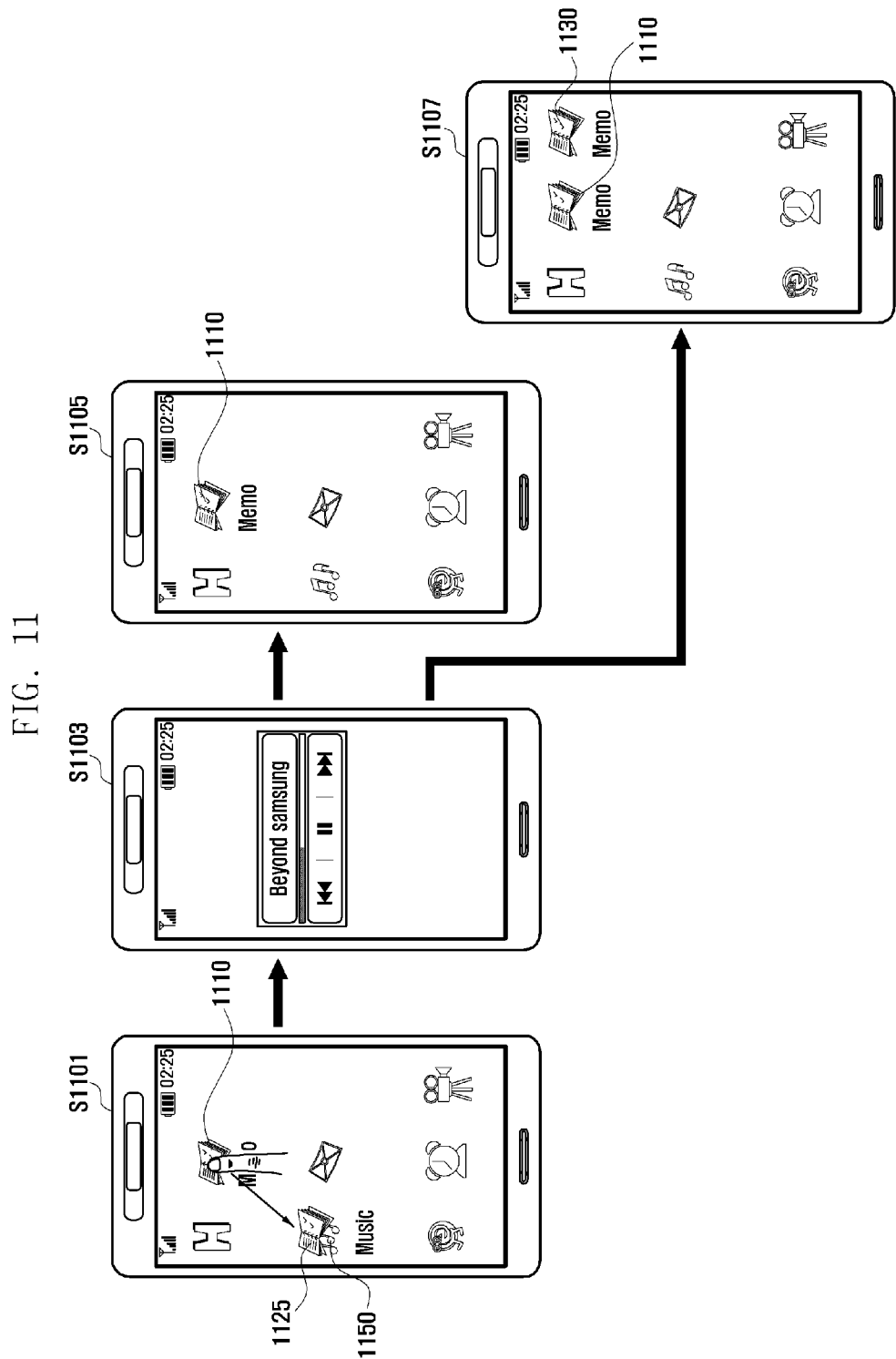
FIG. 11 show screen representations illustrating creation of a selection item after an execution of a user function by combining menu items.

FIG. 11 shows a screen representation illustrating creation of a selection item after execution of a user function by combining menu items. FIG. 11 depicts a selection item handled after executing a function of a target item. This is according to the text information of a selection item. Referring to FIG. 11, in response to a user request, then the control unit 160 may execute a function. The function corresponds to the target item 1150 according to the text information of the selection item 1110 as shown in presentations S1101 and S1103. In presentation S1101, reference symbol 1125 indicates a virtual item. The virtual item corresponds to the selection item 1110. The virtual item may provide a visual effect. The visual effect or indication preferably matches the selection item 1110 and enables the user to intuitively recognize movement of the selection item 1110.

When the user terminates execution of the function of the target item 1150 then the control unit 160 may preserve or discard the text information. The discarded text information corresponds to the selection item 1110 according to user settings as shown in presentations S1105 and S1107.

Turning now to presentation S1105, the selection item 1110 may be reinitialized. The selection item 1110 may be discarded. Also the text information can be discarded or part of the data including the text information can be discarded.

In presentation S1107, the text information of the selection item 1110 is transferred to a new second selection item 1130. That is, a new selection item having the existing text information is created. The new selection item 1130 may preserve the transferred text information. The old selection item 1110 may have no text information attributed to the re-initialization. Hence, for a function execution by selection and target item combination, the user may specify a selection item having existing text information. The user may also specify an initialized selection item to enter new text information.

Hereinabove, the embodiments in FIGS. 1 to 11 are described using a mobile terminal 100 having a touch screen. However, the present invention is not limited to a mobile terminal having a touch screen, and the present invention may also be applicable to a mobile terminal having an LCD display and at least one of a keypad and a touchpad.

That is, the mobile terminal 100 may display menu items on the screen according to a user request. The terminal 100 may then combine a menu item with another menu item according to user manipulation through the touchpad or keypad. For example, the user may specify a selection item and a target item on the screen. The user may then move the selection item to the target item using direction and selection keys of the keypad. In addition, a microphone and a motion sensor (accelerometer) may be used for a function execution by a menu item combination. That is, features like voice recognition and motion recognition may be used to control a function execution by a menu item combination.

In the above description, drag-and-drop events are mainly used to trigger the function execution by the menu item combination. However, the present invention is not limited by to drag and drop events, and other user gestures corresponding to multi-touch events or single-touch events may also be used and are within the scope of the present disclosure. For example, the user may make a multi-touch gesture by touching a selection item (first touch). The user may then touch a target item (second touch) while sustaining the first touch. The user may make a pinch gesture. This may occur by touching a selection item (first touch), then touching a target item (second touch), and then bringing the first touch and second touch closer together using the input device.

The mobile terminal 100 of the present invention may be any form of information and communication appliance such as a mobile communication terminal supporting a communication protocol. The communication protocol may be for a communication system, a portable multimedia player (PMP), a digital broadcast receiver, a personal digital assistant (PDA), a music player such as an MP3 player, a portable game console, and a smart phone. The function executing method of the present invention may be applied to medium to large sized devices. The relatively larger devices may include a television set, a large format display, signs, digital signage, a media kiosk, a personal computer, and a laptop computer or any other digital device that uses an input device.

The embodiments in FIGS. 1 to 11 are described using a full touch screen type mobile terminal 100. However, the present invention is not limited to a full touch screen type mobile terminal. That is, the mobile terminal of the present invention may also be a folder type mobile terminal, a bar type mobile terminal, or a slide type mobile terminal. User gestures may be entered through not only a touch screen but also a touch pad.

As apparent from the above description, the present invention provides a function executing method and apparatus that enables a mobile terminal to simplify an input and selection process. This process is advantageous for executing a specific function to thereby improve user convenience and improve accessibility in using the mobile terminal. Menu item combination makes it possible to simplify a menu navigation process. The menu item combination also provides an input and selection process advantageous to execute a desired user function. The user may execute a desired function in a simple, rapid and intuitive way by combining a selection item having text information with a target item.

According to the present invention, the user may make a simple gesture of combining menu items on the touch screen to execute a desired function in a rapid and convenient manner. Hence, it is possible to enhance user convenience in using the mobile terminal.

According to the present invention, the user may write and store a memo (text information) using a widget function. This may occur instead of navigating main menu and submenu hierarchies in the idle state. The user may execute various functions related to message transmission, message composition, phonebook data creation, call placement, alarm setting, music playback, and video playback. The functions may be executed by making a gesture of combining a selection item having the written memo with one of many target items. In other words, the user may write and store a task description and cause multiple operations to be carried out in sequence.

According to the present invention, the user may write and store a task description using a widget function on the idle screen, and then execute a desired function. This may occur by making a gesture of combining a selection item with a target item. Hence, it is possible to eliminate an inconvenience of navigating the main menu to submenu hierarchies in search of a desired function. This heightens a user convenience and user accessibility in using various functions.

The above-described methods according to the present invention can be realized in hardware or as software or computer code. The code that can be stored in a recording medium such as a CD ROM, an RAM, a floppy disk, a hard disk, or a magneto-optical disk or downloaded over a network. The present invention and the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code. When accessed and executed by the computer, processor or hardware the code then implements the processing methods described herein. In addition, it would be recognized that when a general purpose computer accesses code for implementing the processing shown herein, the execution of the code transforms the general purpose computer into a special purpose computer. The special purpose computer thus executes the processing shown herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method for an electronic device, comprising:
   detecting an event, the event being related to a first item and a second item, the first item and the second item being provided from a plurality of menu items displayed on the electronic device;
   upon detecting the event, parsing text information from the first item to determine whether at least one text segment of the text information matches a function associated with the second item, and if so, extracting the at least one text segment; and
   executing the function associated with the second item, the function using the at least one extracted text segment,
   wherein the first item is one of a memo item for a memo application and a messaging item for a messaging application, and the second item is any one of a phone book item, a web browser item, a phone call item, an alarm clock program item, a music player item, an organizer item, a video player item, or the other one of the memo item and the messaging item.

2. The method of claim 1, further comprising detecting the event by detecting a user gesture, the user gesture combining the first item and the second item.

3. The method of claim 1, wherein the executed function is a first function associated with the second item, and the method further comprising:
   executing a second function associated with the second item using other text information of the parsed text information.

4. The method of claim 1, wherein the second item is a phone call item or text messaging icon, the extracted text segment is a phone number and the function executed initiates a phone call or text message transmission using the extracted phone number.

5. The method of claim 4, wherein the second item is a text messaging item, the parsed text information comprises the phone number and other text information, the function executed initiates a text message transmission using the extracted phone number and includes the other information in a body of the text message.

6. The method of claim 1, wherein the second item is a media player item, the extracted text segment is a media title, and executing the function comprises playing back stored media corresponding to the media title.

7. The method of claim 1, further comprising designating the first item as a selection item and the second item as a target item when selecting the second item after selecting the first item.

8. A method for an electronic device, comprising:
   providing a first item;
   detecting a combination function event, the combination function event being related to the first item and a second item;
   parsing text information from the first item to determine whether at least one text segment of the text information matches a function associated with the second item, and if so, extracting the at least one text segment and providing the extracted text segment to the second item; and
   executing the function associated with the second item, the function being executed by using the at least one extracted text segment,
   wherein the first item is one of a memo item for a memo application and a messaging item for a messaging application, and the second item is any one of a phone book item, a web browser item, a phone call item, an alarm clock program item, a music player item, an organizer item, a video player item, or the other one of the memo item and the messaging item.

9. The method of claim 8, further comprising selecting the first item and recording an input information from the user, the input information being input using an input window, the input window being provided by the selection of the first item.

10. The method of claim 9, further comprising detecting the combination function event by detecting a user gesture.

11. The method of claim 9, wherein the second item is a media player item, the extracted text segment is a media title, and executing the function comprises connecting to the Internet to find media matching the media title, and downloading the matched media.

12. The method of claim 9, wherein the executed function is a first function, and further comprising executing a second function associated with the second item using other text information of the parsed text information.

13. The method of claim 9, wherein the first item receives and stores information.

14. The method of claim 9, further comprising preserving the text information of the first item after executing the function, or further comprising discarding the text information of the first item and creating a second first item comprising the text information.

15. The method of claim 10, further comprising detecting the combination function event by providing a virtual image of the first item in response to the user gesture.

16. The method of claim 8, further comprising designating the first item as the selection item and the second item as the target item when selecting the second item after selecting the first item.

17. An electronic device comprising:
a display unit controlled to display a first item and a second item; and
a control unit, the control unit controlling an operation upon detecting an event designating both the first item and the second item, the operation comprising parsing text information from the first item to determine whether at least one text segment of the text information matches a function associated with the second item, and if so, extracting the at least one text segment and executing the function associated with the second item using the at least one extracted text segment,
wherein the first item is one of a memo item for a memo application and a messaging item for a messaging application, and the second item is any one of a phone book item, a web browser item, a phone call item, an alarm clock program item, a music player item, an organizer item, a video player item, or the other one of the memo item and the messaging item.

18. The electronic device of claim 17, wherein the function is a first function or a second function, the first function is executed when the extracted text segment comprises a first type of text segment, and the second function is executed when the parsed text information does not include the first type of text segment.

19. The electronic device of claim 17, further comprising the control unit designating the first item as the selection item and the second item as the target item when selecting the second item after selecting the first item.

20. A method in an electronic device, comprising:
displaying via a screen a plurality of menu items associated with different respective applications;
upon detecting selection of a particular one of the menu items, displaying a window within which text is pre-existing or newly input through receiving a user input, while maintaining display of remaining items of the displayed menu items; and
upon detecting an input event involving the window and a second item among the remaining items, parsing text within the window, determining from the parsed text a text segment matching a function of the application associated with the second item, and executing the function using the matching text segment applied as input to the application,
wherein the particular one of the menu items is one of a memo item for a memo application and a messaging item for a messaging application, and the second item is any one of a phone book item, a web browser item, a phone call item, an alarm clock program item, a music player item, an organizer item, a video player item, or the other one of the memo item and the messaging item.

21. The method of claim 20, wherein the items are each icons.

22. The method of claim 20, wherein the electronic device includes a touch screen, and the input event is a touch gesture involving the window and the second item.

23. The method of claim 20, further comprising designating the first item as the selection item and the second item as the target item when selecting the second item after selecting the first item.

24. An electronic device comprising:
a touch screen; and
a control unit operatively coupled to the touch screen and configured to execute operations of:
displaying via the touch screen a plurality of menu items associated with different respective applications;
upon detecting selection of a first menu item of the menu items, displaying a window within which text is pre-written or newly input, while maintaining display of the other menu items, the first menu item being a memo item or a messaging item; and
upon detecting an input event involving one of: (a)(i) the window, or (a)(ii) the first menu item displayed after the window is closed; and, (b) a second item among the remaining menu items, parsing text last displayed within the window, determining from the parsed text a text segment matching a function of the application associated with the second item, and executing the function using the matching text segment applied as input to the application,
wherein the second item is any one of a phone book item, a web browser item, a phone call item, an alarm clock program item, a music player item, an organizer item, a video player item, or the other one of the memo item and the messaging item.

25. The electronic device of claim 24, wherein the input event is a touch gesture involving the window and the second item.

26. The electronic device of claim 24, wherein the input event is a touch gesture involving the first menu item displayed after the window is closed, and the second item.

27. The electronic device of claim 24, wherein executing the function does not use at least one other text segment of the parsed text last displayed within the window that is determined not to match the function.

28. The electronic device of claim 24, wherein the messaging item is a text messaging item.

* * * * *